(12) United States Patent
Nishimoto et al.

(10) Patent No.: US 7,535,814 B2
(45) Date of Patent: May 19, 2009

(54) OPTICAL PICKUP DEVICE

(75) Inventors: Masahiko Nishimoto, Osaka (JP); Naoki Nakanishi, Shiga (JP); Masayuki Ono, Osaka (JP)

(73) Assignee: Panasonic Corporation, Osaka (JP)

( * ) Notice: Subject to any disclaimer, the term of this patent is extended or adjusted under 35 U.S.C. 154(b) by 342 days.

(21) Appl. No.: 11/704,967

(22) Filed: Feb. 12, 2007

(65) Prior Publication Data
US 2007/0274367 A1  Nov. 29, 2007

(30) Foreign Application Priority Data
May 29, 2006  (JP)  ............................. 2006-148226

(51) Int. Cl.
*G11B 7/00* (2006.01)
(52) U.S. Cl. ............................. 369/112.07; 369/44.37
(58) Field of Classification Search ................... 369/125
See application file for complete search history.

(56) References Cited

U.S. PATENT DOCUMENTS

| | | | | |
|---|---|---|---|---|
| 5,886,964 A | * | 3/1999 | Fujita | 369/44.37 |
| 6,400,664 B1 | * | 6/2002 | Shimano et al. | 369/44.37 |
| 6,728,173 B2 | * | 4/2004 | Shimano et al. | 369/44.37 |
| 2004/0081064 A1 | * | 4/2004 | Ohnishi et al. | 369/125 |
| 2007/0133374 A1 | * | 6/2007 | Arai | 369/112.05 |
| 2009/0022032 A1 | * | 1/2009 | Kawasaki et al. | 369/109.02 |

FOREIGN PATENT DOCUMENTS

JP  2004-145915 A  5/2004

* cited by examiner

*Primary Examiner*—Wayne R Young
*Assistant Examiner*—Van N Chow
(74) *Attorney, Agent, or Firm*—McDermott Will & Emery LLP (57) ABSTRACT

An optical pickup device includes a diffraction grating for separating a light beam from a semiconductor laser into at least three light beams. The diffraction grating is partitioned into five areas each having a given periodic structure: a first area; a second area adjacent to the first area in a first direction; a third area adjacent to the first and second areas in a second direction; a fourth area sandwiching the third area with the first area; and a fifth area adjacent to the fourth area in the first direction and sandwiching the third area with the second area. The phase of the periodic structure of each of the first and fifth areas is ahead of that of the third area by substantially 90°. The phase of the periodic structure of each of the second and fourth areas is behind that of the third area by substantially 90°.

11 Claims, 11 Drawing Sheets

OPTICAL PICKUP DEVICE

BACKGROUND OF THE INVENTION (1) Field of the Invention

The present invention relates to an optical pickup device having the function of detecting signals such as a playback/recording signal and various servo signals used in an optical head device serving as a main part of an optical information processor performing processing, such as recording, playback or erasure of information, on an optical information recording medium such as an optical disk.

(2) Background Art

To record and play back compact discs (CDs) having the largest share of the optical disk market, near-infrared semiconductor lasers in a wavelength band of 780 nm to 820 nm are currently used. On the other hand, to record and play back digital versatile discs (DVDs) that are rapidly-widespread optical information recording media having a higher recording density, red semiconductor lasers having a shorter wavelength in a 635 nm to 680 nm band are used to reduce the area of the optical spot. Guide grooves have different pitches depending on the type of optical information recording media. It is required that a single device performs recording and playback on two or more types of optical information recording media in different standards. In the case of DVDs, DVD-Rs having a guide groove pitch of 0.74 μm and DVD-RAMs having a guide groove pitch of 1.23 μm, for example, are used and one device needs to be employed for such DVDs. In view of this, a conventional optical pickup device as illustrated in FIG. 7 was proposed (see, for example, Japanese Unexamined Patent Publication No. 2004-145915).

Figure 7:
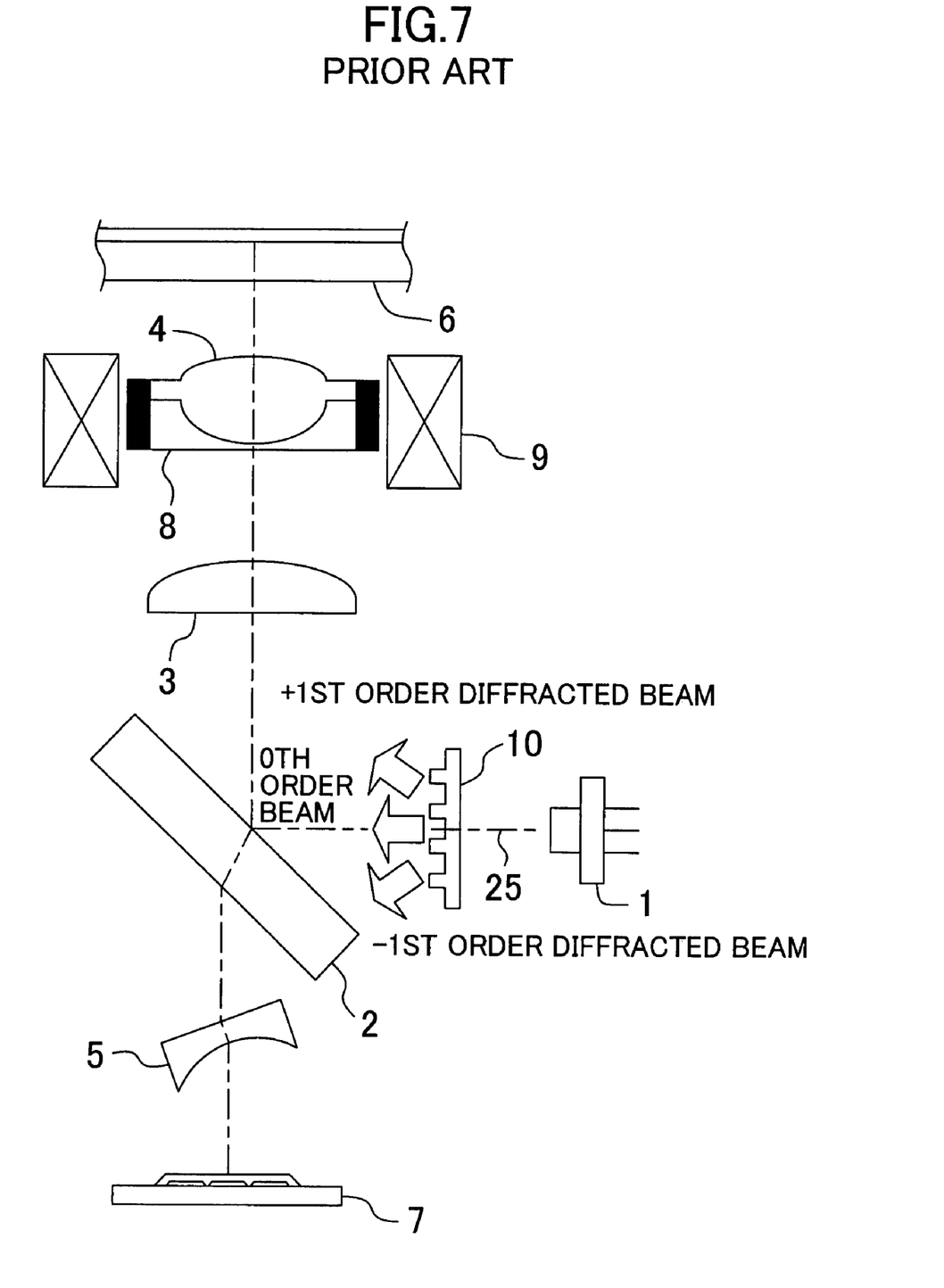
FIG. 7 is a view schematically illustrating a conventional optical pickup device.

FIG. 7 is a view schematically illustrating an example of a configuration of a conventional optical pickup device.

In FIG. 7, reference numeral 1 denotes a semiconductor laser light source, reference numeral 2 denotes a half mirror (or a beam splitter), reference numeral 3 denotes a collimator lens, reference numeral 4 denotes an object lens, reference numeral 5 denotes a detection lens, reference numeral 6 denotes an optical information recording medium, reference numeral 7 denotes a photodetector having photodetector surfaces partitioned according to a prescribed pattern, reference numeral 8 denotes a lens holder, reference numeral 9 denotes a two-dimensional actuator composed of electromagnetic circuits and reference numeral 10 denotes a diffraction grating.

Figure 8:
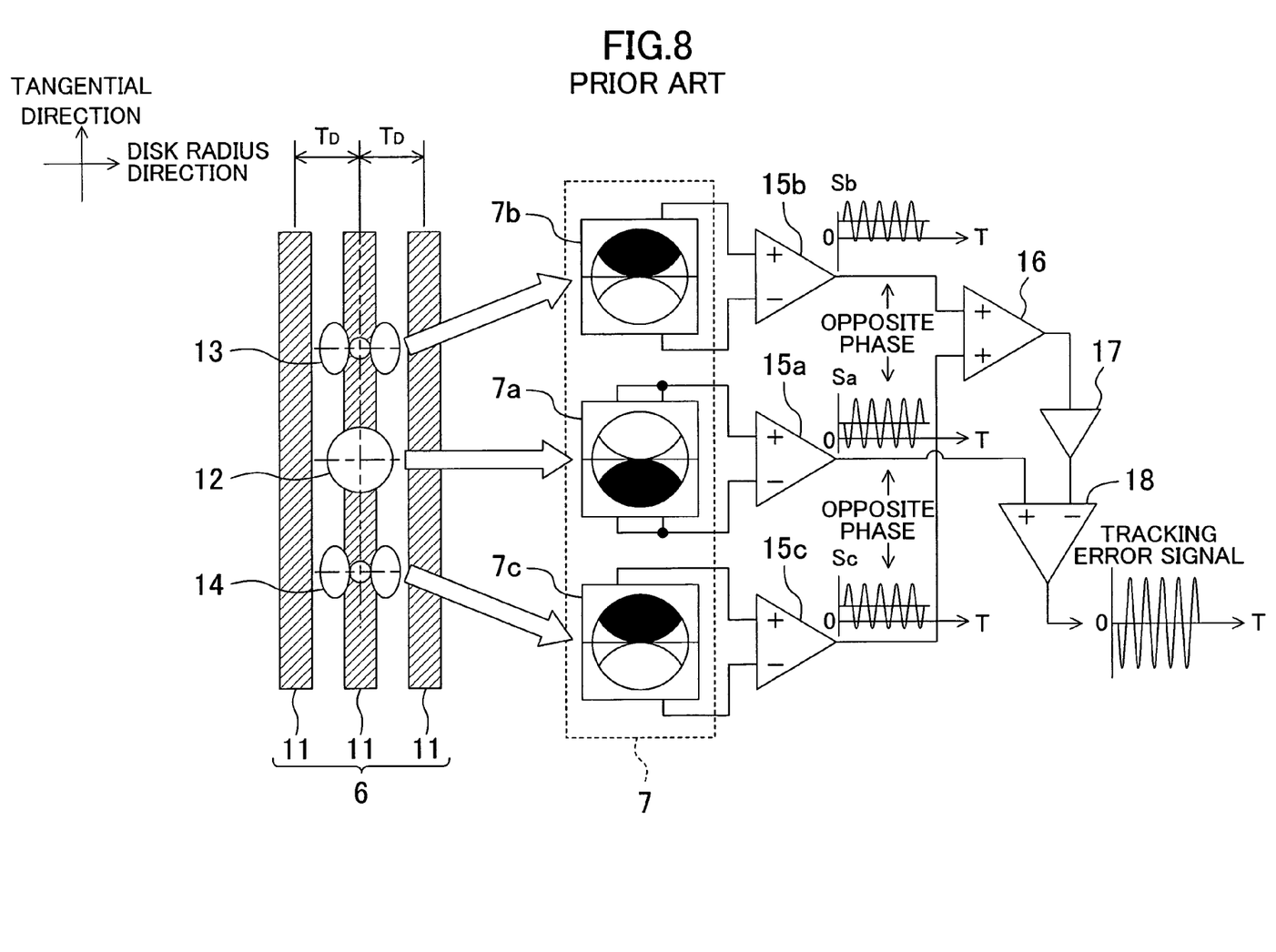
FIG. 8 is a view illustrating convergence spots on the recording surface of an optical information recording medium formed by the conventional optical pickup device and also specifically illustrating a photodetector in the conventional optical pickup device.

As illustrated in FIG. 7, the object lens 4 is fixed in the lens holder 8 and driven by the two-dimensional actuator 9 in two directions: the direction along the optical axis (i.e., the direction of a laser beam 25 emitted from the semiconductor laser source 1) and the tracking direction. Hereinafter, the direction along the optical axis will be referred to as a focus direction. The diffraction grating 10 is placed between the semiconductor laser source 1 and the half mirror 2. The laser beam 25 emitted by the semiconductor laser source 1 is diffracted and separated by the diffraction grating 10 into at least three beams: a 0th order beam; a +1st order diffracted beam; and a −1st order diffracted beam (not shown). The separated beams are reflected by the half mirror 2 and then reach the object lens 4 via the collimator lens 3. The 0th order beam, the +1st order diffracted beam and the −1st order diffracted beam diffracted and separated by the diffraction grating 10 are caused to separately converge on the recording surface of the optical information recording medium 6 by the object lens 4 to form three convergence spots. At this time, as shown on the left side of FIG. 8, the three convergence spots 12 (corresponding to the 0th order beam), 13 (corresponding to the +1st order diffracted beam) and 14 (corresponding to the −1st order diffracted beam) are formed at a time on one of guide grooves 11 periodically (at a pitch $T_D$) provided on the optical information recording medium 6. That is, the convergence spots 12, 13 and 14 are arranged substantially in a line.

In addition, as illustrated in FIG. 7, the beams reflected from the convergence spots on the optical information recording medium 6 travel reversely on almost the same optical path to the half mirror 2 through the object lens 4 and the collimator lens 3 in this order. Part of light quantity of the reflected beams passes through the half mirror 2 and is incident on photoreceptor surfaces of the multi-face photodetector 7 via the detection lens 5. Based on signals obtained by the photoreceptor surfaces of the photodetector 7, object lens position control signals such as a focus error signal and a tracking error signal and an information signal which has been recorded on the recording surface of the optical information recording medium 6 are detected by arithmetic circuitry. As shown on the right side of FIG. 8, the tracking error signal is detected by the processing of arithmetic circuitry having a similar configuration to that used in a conventional differential push-pull (DPP) method on signals detected by photoreceptor surfaces 7a (i.e., a photoreceptor surface for the reflected beam of the convergence spot 12), 7b (i.e., a photoreceptor surface for the reflected beam of the convergence spot 13) and 7c (i.e., a photoreceptor surface for the reflected beam of the convergence spot 14) of the photodetector 7. This arithmetic circuitry is composed of, for example, subtracters 15a, 15b and 15c connected to the respective photoreceptor surfaces 7a, 7b and 7c each divided into two, an adder 16 connected to the subtracters 15b and 15c, an amplifier 17 connected to the adder 16, and a subtracter 18 connected to the subtracter 15a and the amplifier 17.

Figure 9:
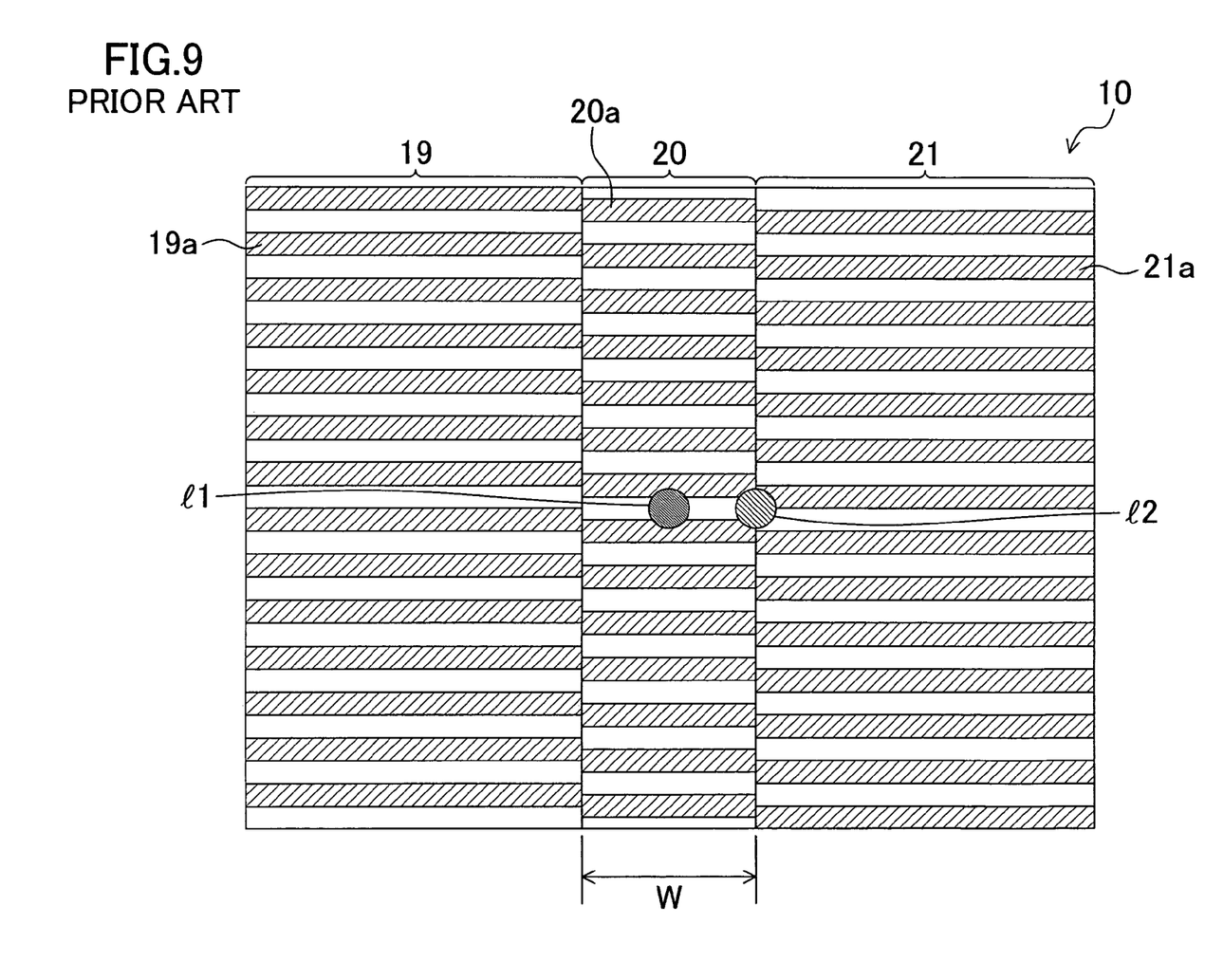
FIG. 9 is a view schematically showing a periodic structure of a diffraction grating in the conventional optical pickup device illustrated in FIG. 7.

FIG. 9 is a plan view illustrating a grating pattern of the diffraction grating 10 used in the conventional optical pickup device illustrated in FIG. 7. As illustrated in FIG. 9, while grooves 19a, 20a and 21a are formed at even intervals on the grating surface of the diffraction grating 10, the grating surface is partitioned into at least three areas 19, 20 and 21 by parting lines that are orthogonal to the grooves 19a, 20a and 21a. In other words, the grating surface is partitioned into at least three areas 19, 20 and 21 by parting lines parallel to the tracing direction (i.e., the tangential direction in FIG. 8) of the optical information recording medium 6. The grooves 19a, 20a and 21a are formed in the respective areas 19, 20 and 21. The area 20 at the center of the grating surface of the diffraction grating 10 has a given width W along the direction in which the grooves 20a extend. The phase of the grooves 19a periodically formed in the area 19 adjoining the central area 20 is ahead of that of the grooves 20a periodically formed in the central area 20 by 90° (i.e., is differentiated from that of the area 20 by +90°). That is, the interval of the grooves 19a in the area 19 is shifted by approximately one-fourth of that of the grooves 20a in the central area 20. Meanwhile, the phase of the grooves 21a periodically formed in the area 21 adjoining the central area 20 on the side opposite the area 19 is behind that of the grooves 20a in the central area 20 by 90° (i.e., is differentiated from that of the area 20 by −90°). That is, the interval of the grooves 21a in the area 21 is shifted by approximately one-fourth of the grooves 20a in the central area 20 in the direction opposite the direction of the shift of the grooves 19a in the area 19. Thus, the phase of the grooves 19a periodically formed in the area 19 is shifted from the phase of the grooves 21a periodically formed in the area 21 by 180°. That is, the arrangement of the grooves 19a in the area 19 is shifted from the arrangement of the grooves 21a in the area 21 by half a pitch.

The aforementioned conventional optical pickup device employing a tracking error detection method called an in-line DPP method enables stable tracking error detection on a plurality of optical information recording media having different guide groove pitches.

SUMMARY OF THE INVENTION

However, the conventional optical pickup device employing the in-line DPP method uses the diffraction grating 10 associated with one laser light source. Accordingly, in applying the diffraction grating 10 to an optical pickup device in which two or more laser light sources are located adjacent to each other, the following problems arise.

Figure 10:
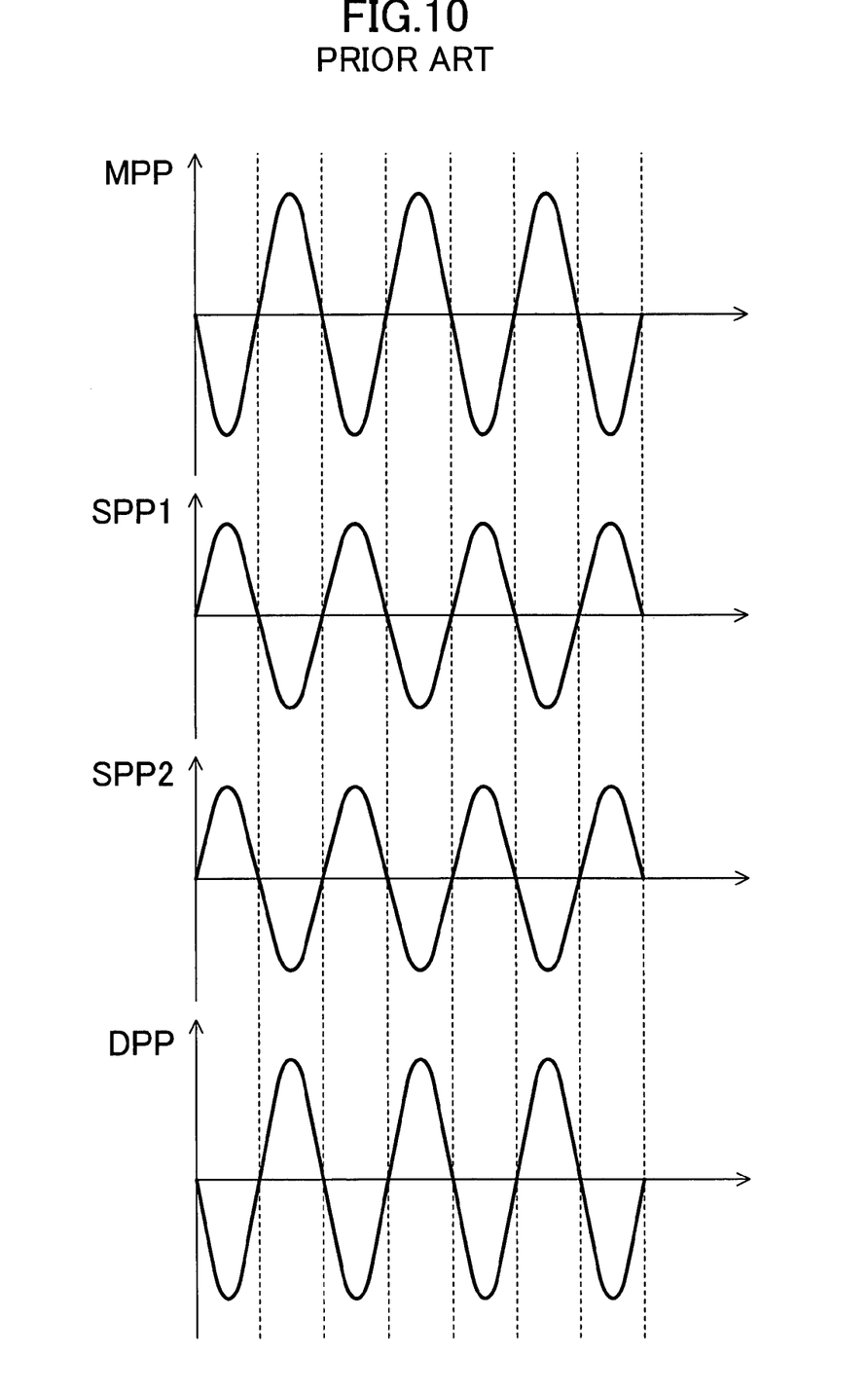
FIG. 10 is a graph showing signal waveforms obtained by the photodetector of the conventional optical pickup device illustrated in FIG. 7.

That is, with respect to one of the light sources, the diffraction grating 10 is provided in such a manner that the center 11 of a light beam emitted by this light source passes through the central area 20 of the diffraction grating 10 as illustrated in FIG. 9, so that stable tracking error signal detection by the in-line DPP method is performed as shown in FIG. 10. In FIG. 10, MPP is a main push-pull signal, SPP1 and SPP2 are two sub-push-pull signals, and DPP is a tracking error signal obtained from the signals MPP, SPP1 and SPP2. As shown in FIG. 10, the phases of SPP1 and SPP2 are shifted from that of MPP exactly by 180°, so that DPP has a proper value and convergence spots are formed on a single groove.

Figure 11:
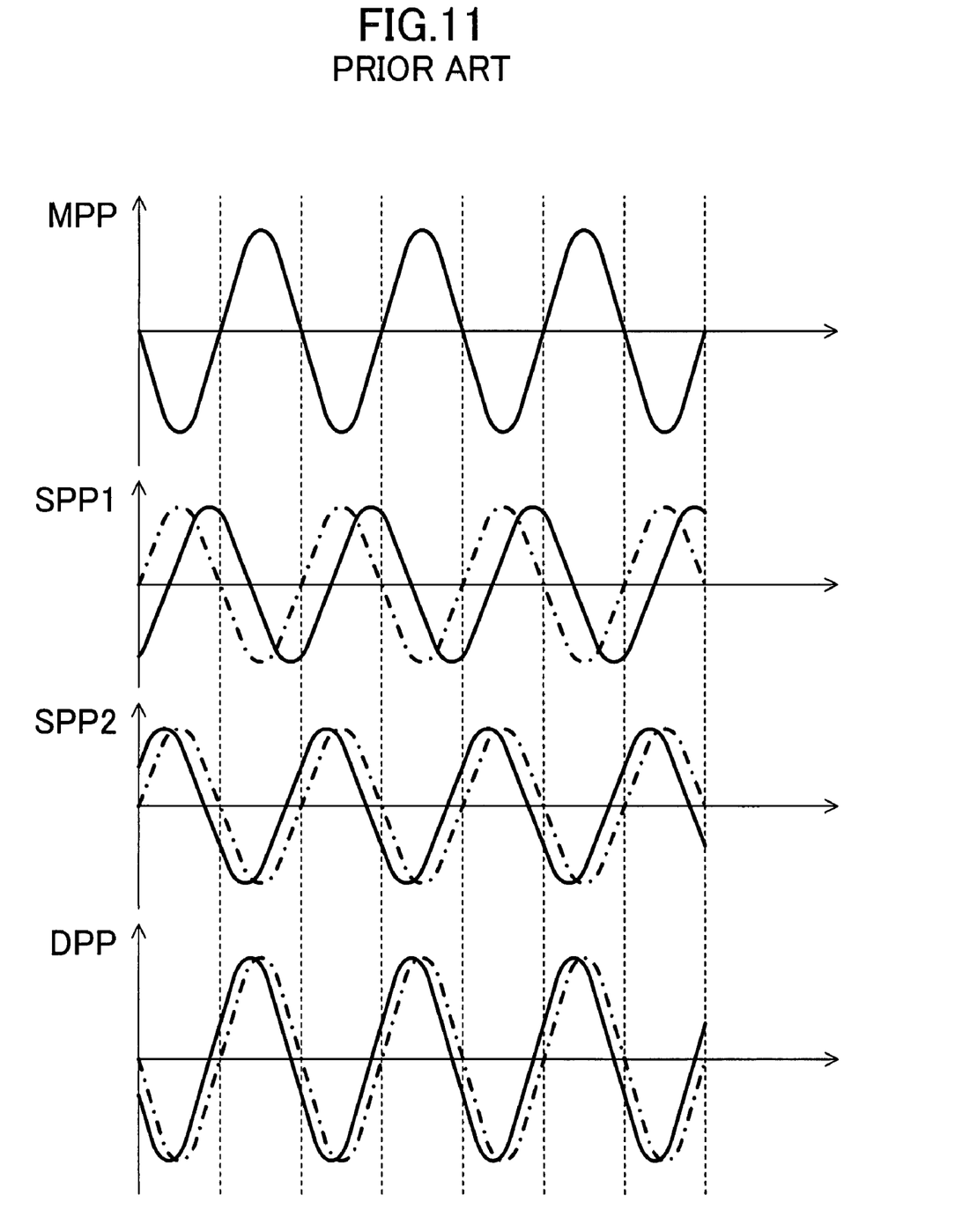
FIG. 11 is a graph showing signal waveforms obtained by the photodetector of the conventional optical pickup device illustrated in FIG. 7.

However, with respect to another light source, the center 12 of a light beam emitted by this light source does not pass through the central area 20 of the diffraction grating 10 but passes through the boundary between the area 20 and the area 21, for example, as shown in FIG. 9, i.e., a larger amount of the light beam emitted by this light source passes through the area 21. Accordingly, stable tracking error signal detection by the in-line DPP method cannot be performed, as shown in FIG. 11. That is, the shift of the phases of SPP1 and SPP2 from that of MPP is not 180° as shown in FIG. 11, so that DPP fails to have a proper value and convergence spots cannot be formed on a single guide groove. In FIG. 11, proper values of SPP1, SPP2 and DPP are indicated by dash-dotted lines.

In view of the foregoing problems of the conventional optical pickup device, it is therefore an object of the present invention to provide an optical pickup device in which two or more light sources are provided adjacent to each other and stable tracking error detection is performed on two or more optical information recording media having different guide groove pitches while maintaining the advantages of the in-line DPP method.

To achieve the object, an optical pickup device according to the present invention includes: a first semiconductor laser emitting a light beam having a first wavelength; a second semiconductor laser placed in parallel with the first semiconductor laser and emitting a light beam having a second wavelength different from the first wavelength; a diffraction grating for separating one of the light beam with the first wavelength and the light beam with the second wavelength into at least three light beams; an object lens for causing each of said at least three light beams separated by the diffraction grating to converge and causing said at least three light beams to form at least three separate convergence spots on a recording surface of an optical information recording medium; and a photodetector for receiving light beams respectively reflected from said at least three convergence spots on the optical information recording medium, wherein the diffraction grating is partitioned into at least five areas each having a given periodic structure, said at least five areas include a first area, a second area adjacent to the first area in a first direction, a third area adjacent to the first area and the second area in a second direction, a fourth area defined with the third area sandwiched between the fourth area and the first area and a fifth area adjacent to the fourth area in the first direction and defined with the third area sandwiched between the fifth area and the second area, a phase of the periodic structure of each of the first and fifth areas is ahead of a phase of the periodic structure of the third area by substantially 90°, and a phase of the periodic structure of each of the second and fourth areas is behind a phase of the periodic structure of the third area by substantially 90°.

In the optical pickup device of the present invention, said at least three light beams separated by the diffraction grating may include a 0th order diffracted beam, a +1st order diffracted beam and a −1st order diffracted beam.

In the optical pickup device of the present invention, a plurality of guide grooves may be periodically arranged on the recording surface of the optical information recording medium, and the object lens may cause said at least three convergence spots to be formed on one of the guide grooves.

In the optical pickup device of the present invention, the first, second, third, fourth and fifth areas of the diffraction grating may have structures in which grooves and projections are alternately formed and the grooves and the projections have an identical width.

In the optical pickup device of the present invention, the direction of a first parting line between the first area and the second area of the diffraction grating and a second parting line between the fourth area and the fifth area of the diffraction grating may substantially coincide with a direction parallel to a radius direction of the optical information recording medium, the direction of a third parting line between the third area and each of the first and second areas of the diffraction grating and the direction of a fourth parting line between the third area and each of the fourth and fifth areas of the diffraction grating may substantially coincide with a direction parallel to a guide groove provided in the optical information recording medium, and the first parting line and the second parting line may be substantially located on an identical line.

The definitions, "parallel" and "vertical", herein mean not only spatial "parallel" and "vertical" but also "parallel" and "vertical" in an optical system in consideration of reflection and other phenomena caused by, for example, the mirror.

In the optical pickup device of the present invention, the direction of a line connecting a light-beam emission point of the first semiconductor laser and a light-beam emission point of the second semiconductor laser may substantially coincide with a radius direction of the optical information recording medium.

In the optical pickup device of the present invention, a first parting line between the first area and the second area of the diffraction grating and a second parting line between the fourth area and the fifth area of the diffraction grating may be substantially located on an identical line, and the diffraction grating may be oriented to cause centers of light beams emitted from the first semiconductor laser and the second semiconductor laser, respectively, to pass through the identical line.

In the optical pickup device of the present invention, the second wavelength may be longer than the first wavelength, a center of a light beam emitted from the first semiconductor laser may pass through the third area of the diffraction grating, and a center of a light beam emitted from the second semiconductor laser may pass through an intersection of a second parting line between the fourth area and the fifth area of the diffraction grating and a fourth parting line between the third area and each of the fourth and fifth areas of the diffraction grating.

The optical pickup device of the present invention may further include arithmetic circuitry for detecting a tracking error signal by a differential push-pull method, based on an output signal from the photodetector.

In the optical pickup device of the present invention, the first semiconductor laser and the second semiconductor laser may be formed as a two-wavelength monolithic semiconductor laser.

In the optical pickup device of the present invention, the photodetector may include at least three light-receiving elements associated with light beams reflected from said at least three convergence spots on the optical information recording medium, and each of said at least three light-receiving elements may be divided into at least two portions.

Even with a configuration in which two or more different light sources are provided adjacent to each other, an optical pickup device according to the present invention is capable of performing stable tracking error detection on a plurality of optical information recording media having different guide grove pitches.

DETAILED DESCRIPTION OF THE INVENTION

Hereinafter, an optical pickup device according to an embodiment of the present invention will be described with reference to the drawings.

Figure 1:
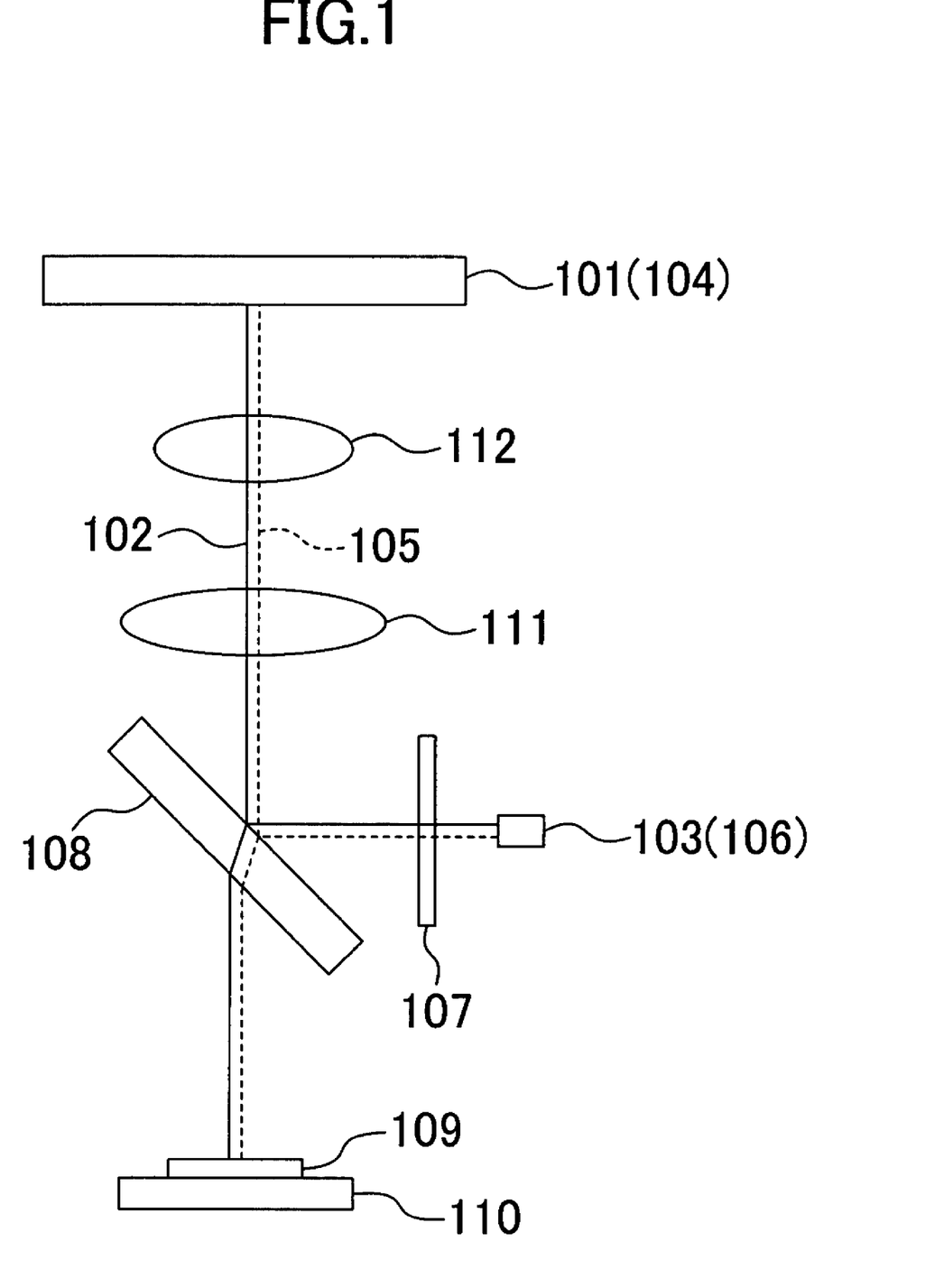
FIG. 1 is a cross-sectional view schematically illustrating a configuration of a main potion of an optical system in an optical pickup device according to an embodiment of the present invention.

FIG. 1 is a view schematically illustrating an example of a configuration of the optical pickup device of this embodiment.

The optical pickup device of this embodiment illustrated in FIG. 1 includes: a first semiconductor laser 103 for emitting a light beam 102 having a first wavelength for recording/playback of a first optical information recording medium 101; a second semiconductor laser 106 for emitting a light beam 105 having a second wavelength (e.g., a wavelength longer than the first wavelength) for recording/playback of a second optical information recording medium 104; a diffraction grating 107 for diffracting and separating the first-wavelength light beam 102 or the second-wavelength light beam 105 into at least a main beam of a 0th order diffracted beam, a sub-beam of a +1st order diffracted beam and a sub-beam of a −1st diffracted beam (not shown); a half mirror 108 for guiding the first-wavelength light beam 102 or the second-wavelength light beam 105 to the first optical information recording medium 101 or the second optical information recording medium 104; and an integrated circuit board 110 provided with a photodetector 109 for receiving the first-wavelength light beam 102 or the second-wavelength light beam 105 reflected from the first optical information recording medium 101 or the second optical information recording medium 104.

A collimator lens 111 and an object lens 112 are placed between the half mirror 108 and the first optical information recording medium 101 or the second optical information recording medium 104. Specifically, the light beam 102 or 105 emitted from the semiconductor laser 103 or 106 is diffracted and separated into at least three light beams of a 0th order beam, a +1st order diffracted beam and a −1st diffracted beam (not shown) by the diffraction grating 107. The separated light beams are reflected by the half mirror 108 and then reach the object lens 112 through the collimator lens 111. The 0th order beam, the +1st order diffracted beam and the −1st diffracted beam diffracted and separated by the diffraction grating 107 are caused to separately converge by the object lens 112 on the recording surface of the optical information recording medium 101 or 104 to form three convergence spots.

In this embodiment, the first semiconductor laser 103 and the second semiconductor laser 106 are adjacent to each other in the direction vertical to the drawing sheet of FIG. 1. That is, the direction of a line connecting the light-beam emission point of the first semiconductor laser 103 and the light-beam emission point of the second semiconductor laser 106 substantially coincides with the radius direction of the optical information recording medium 101 or 104. One of the first and second optical information recording media 101 and 104 is selected and provided in the optical pickup device of this embodiment illustrated in FIG. 1.

Figure 2:
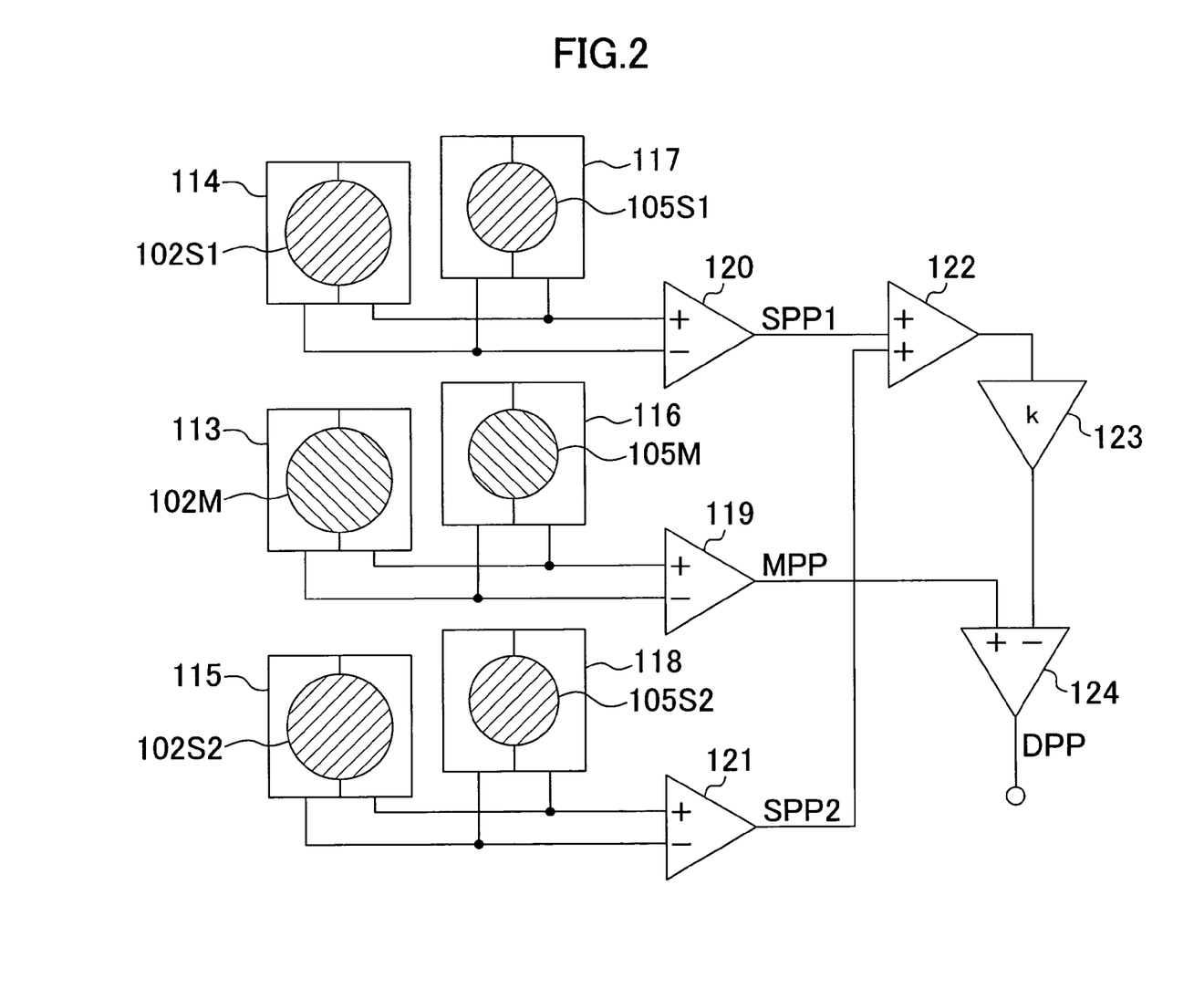
FIG. 2 is a diagram specifically illustrating a photodetector in the optical pickup device illustrated in FIG. 1.

FIG. 2 is a view schematically illustrating a circuit configuration of the integrated circuit board 110 provided with the photodetector 109 in the optical pickup device of this embodiment illustrated in FIG. 1. As illustrated in FIG. 2, a main beam 102M and two sub-beams 102S1 and 102S2 obtained by separating the first-wavelength light beam 102 by the diffraction grating 107 are received by respective light-receiving elements 113, 114 and 115 each divided into two or more. A main beam 105M and two sub-beams 105S1 and 105S2 obtained by separating the second-wavelength light beam 105 by the diffraction grating 107 are received by respective light-receiving elements 116, 117 and 118 each divided into two or more. Subtracters 119, 120 and 121 output push-pull signals MPP, SPP1 and SPP2 using, as inputs, signals detected by the light-receiving elements 113 through 118. Outputs from the light-receiving elements 113 and 116 are input to the subtracter 119, outputs from the light-receiving elements 114 and 117 are input to the subtracter 120 and outputs from the light-receiving elements 115 and 118 are input to the subtracter 121.

FIG. 2 shows a circuit configuration in the case where each light-receiving element is divided into two. The circuit configuration, of course, changes depending on the number of portions into which each light-receiving element is divided. In FIG. 2, the shape of the beam in each of the light-receiving elements is circular for simplicity. However, the beam shape is not limited to this. Arithmetic circuitry (i.e., an adder 122, an amplifier 123 and a subtracter 124) shown in FIG. 2 will be described below.

Figure 3:
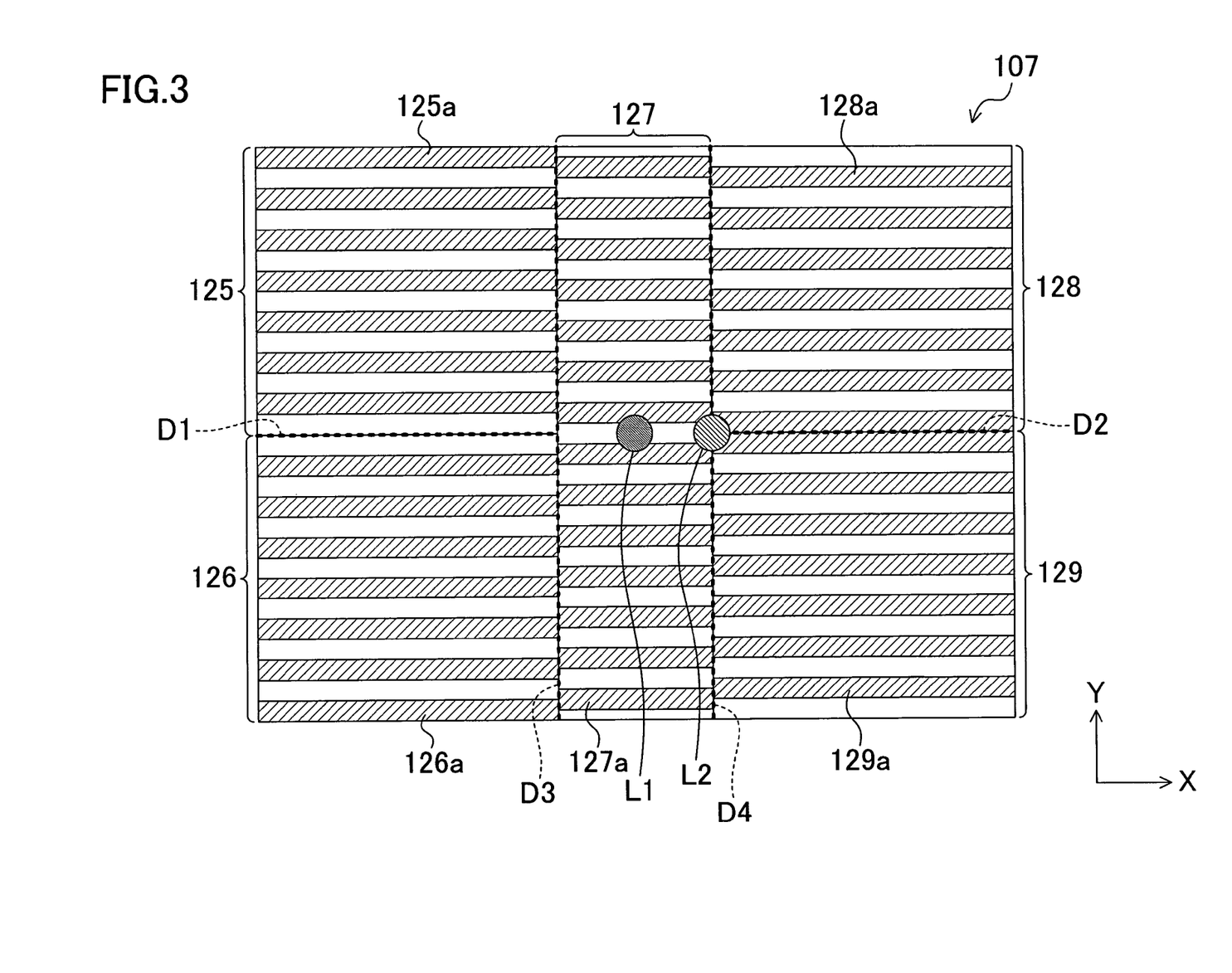
FIG. 3 is a view schematically showing a periodic structure of a diffraction grating in the optical pickup device illustrated in FIG. 1.

This embodiment is characterized by the diffraction grating 107 for diffracting the first-wavelength light beam 102 or the second-wavelength light beam 105, more particularly a periodic structure of the diffraction grating 107. FIG. 3 is a plan view illustrating a periodic structure, i.e., a grating pattern, of the diffraction grating 107 used in the optical pickup device of this embodiment illustrated in FIG. 1.

As illustrated in FIG. 3, the grating surface of the diffraction grating 107 is partitioned into five areas 125 through 129 by parting lines D1 and D2 substantially parallel to the radius direction (hereinafter, referred to as an X direction) of the optical information recording media 101 and 104 and parting lines D3 and D4 substantially parallel to the guide groove direction (hereinafter, referred to as a Y direction) of the optical information recording media 101 and 104. Specifically, the area 125 and the area 126 are adjacent to each other with the parting line D1 sandwiched therebetween, the area 128 and the area 129 are adjacent to each other with the parting line D2 sandwiched therebetween, the area 127 and each of the areas 125 and 126 are adjacent to each other with the parting line D3 sandwiched therebetween, and the area 127 and each of the areas 128 and 129 are adjacent to each other with the parting line D4 sandwiched therebetween. The parting lines D1 and D2 are substantially located on an identical line. The areas 125 and 128 face each other with the area 127 sandwiched therebetween and the areas 126 and 129 face each other with the area 127 sandwiched therebetween.

As illustrated in FIG. 3, grooves 125a through 129a are periodically formed in the respective areas 125 through 129 along the X direction (i.e., the direction in which the parting lines D1 and D2 extend). In this embodiment, the widths and the pitches (i.e., the width of ungrooved portions (projections) of the areas 125 through 129) are the same among the grooves 125a through 129a. The phases of the periodic structures of the areas 125 and 129 are ahead of that of the area 127 by substantially 90° (i.e., is shifted from that of the area 127 by +90°). That is, the intervals of the grooves 125a and 129a in the areas 125 and 129 are shifted by one-fourth from that of the grooves 127a in the area 127 in the +Y direction. The phases of the periodic structures of the areas 126 and 128 are behind that of the area 127 by substantially 90° (i.e., is shifted from that of the area 127 by −90°). That is, the intervals of the grooves 126a and 128a in the areas 126 and 128 are shifted by one-fourth from that of the grooves 127a in the area 127 in the −Y direction. Accordingly, the phases of the periodic structures of the areas 125 and 129 are different from that of the areas 126 and 128 by substantially 180°.

In FIG. 3, L1 schematically indicates the center (hereinafter, can be referred to as an emission center) of the light beam 102 emitted from the first semiconductor laser 103 and L2 schematically indicates the center (i.e., an emission center) of the light beam 105 emitted from the second semiconductor laser 106. In this embodiment, it is assumed that the emission centers L1 and L2 are located at positions indicated in the diffraction grating 107 shown in FIG. 3 within the range of assembly accuracy of the device. Specifically, the emission center L1 of the first semiconductor laser 103 is located in the area 127 of the diffraction grating 107 (specifically on the line on which the parting lines D1 and D2 are located) and the emission center L2 of the second semiconductor laser 106 is located near an intersection of the parting lines D2 and D4. That is, the emission centers L1 and L2 are located on the line on which the parting lines D1 and D2 are located. The emission center L2 of the second semiconductor laser 106 may be located near an intersection of the parting lines D1 and D3.

As described above, a given phase difference is formed in sub-beams of the first-wavelength light beam 102 and the second-wavelength light beam 105 by the periodic structures formed in the five areas 125 through 129 of the diffraction grating 107 shown in FIG. 3. The sub-beams of the first-wavelength light beam 102 and the second-wavelength light beam 105 are guided to the optical information recording medium 101 or 104.

Figure 4A:
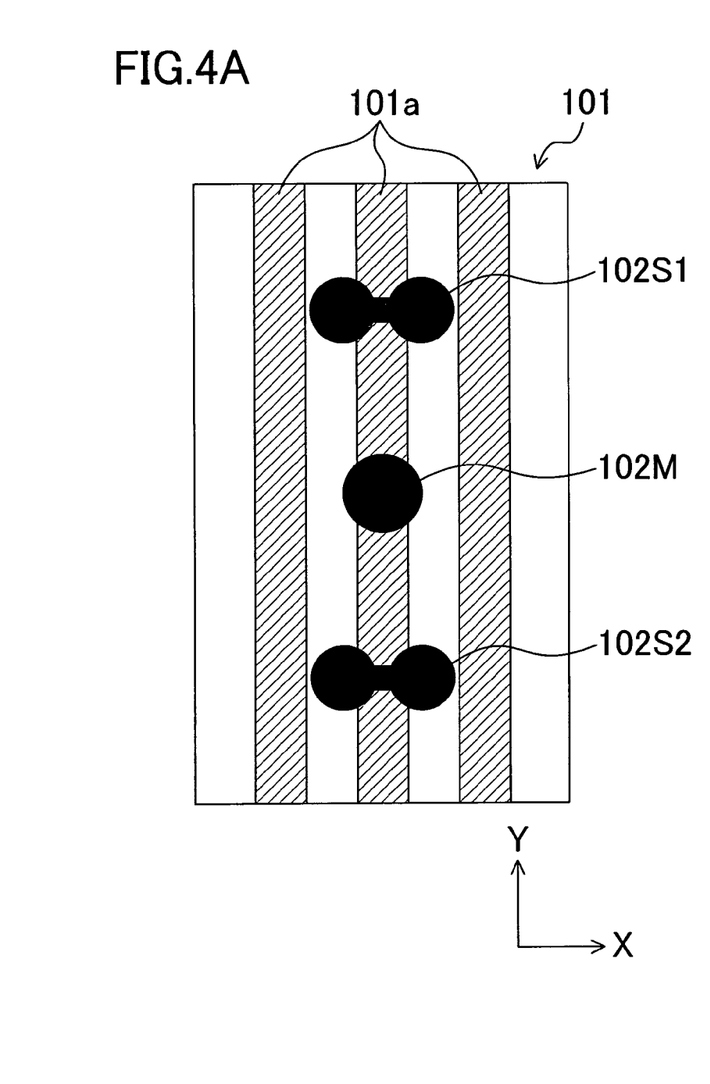
FIGS. 4A and 4B are views illustrating the shapes of convergence spots on the recording surface of an optical information recording medium formed by a main beam and two sub-beams generated by the diffraction grating having the configuration shown in FIG. 3.
Figure 4B:
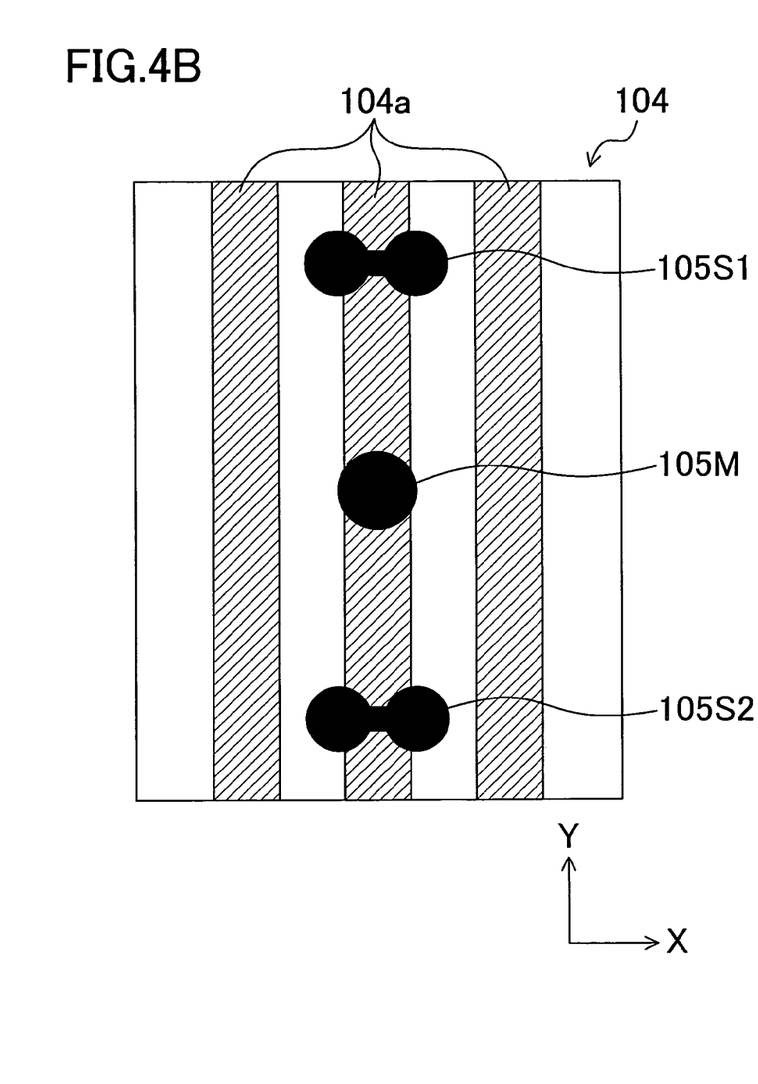

FIG. 4A shows the shapes of convergence spots on the recording surface of the optical information recording medium 101 formed by the main beam 102M and the two sub-beams 102S1 and 102S2 of the first-wavelength light beam 102 generated by the diffraction grating 107 having the configuration shown in FIG. 3. FIG. 4B shows the shapes of convergence spots on the recording surface of the optical information recording medium 104 formed by the main beam 105M and the two sub-beams 105S1 and 105S2 of the second-wavelength light beam 105 generated by the diffraction grating 107 having the configuration shown in FIG. 3. FIGS. 4A and 4B show portions of the optical information recording media 101 and 104. In FIGS. 4A and 4B, the X and Y directions are defined in the same manner as in FIG. 3.

As shown in FIGS. 4A and 4B, a plurality of guide grooves 101a are periodically arranged on the recording surface of the optical information recording medium 101, whereas a plurality of guide grooves 104a are periodically arranged on the recording surface of the optical information recording medium 104. As shown in FIGS. 4A and 4B, the convergence spots (formed by the object lens 112) of the main beam 102M and the two sub-beams 102S1 and 102S2 of the first-wavelength light beam 102 are arranged on one of the guide grooves 101a, whereas the convergence spots (formed by the object lens 112) of the main beam 105M and the two sub-beams 105S1 and 105S2 of the second-wavelength light beam 105 are arranged on one of the guide grooves 104a.

Figure 5:
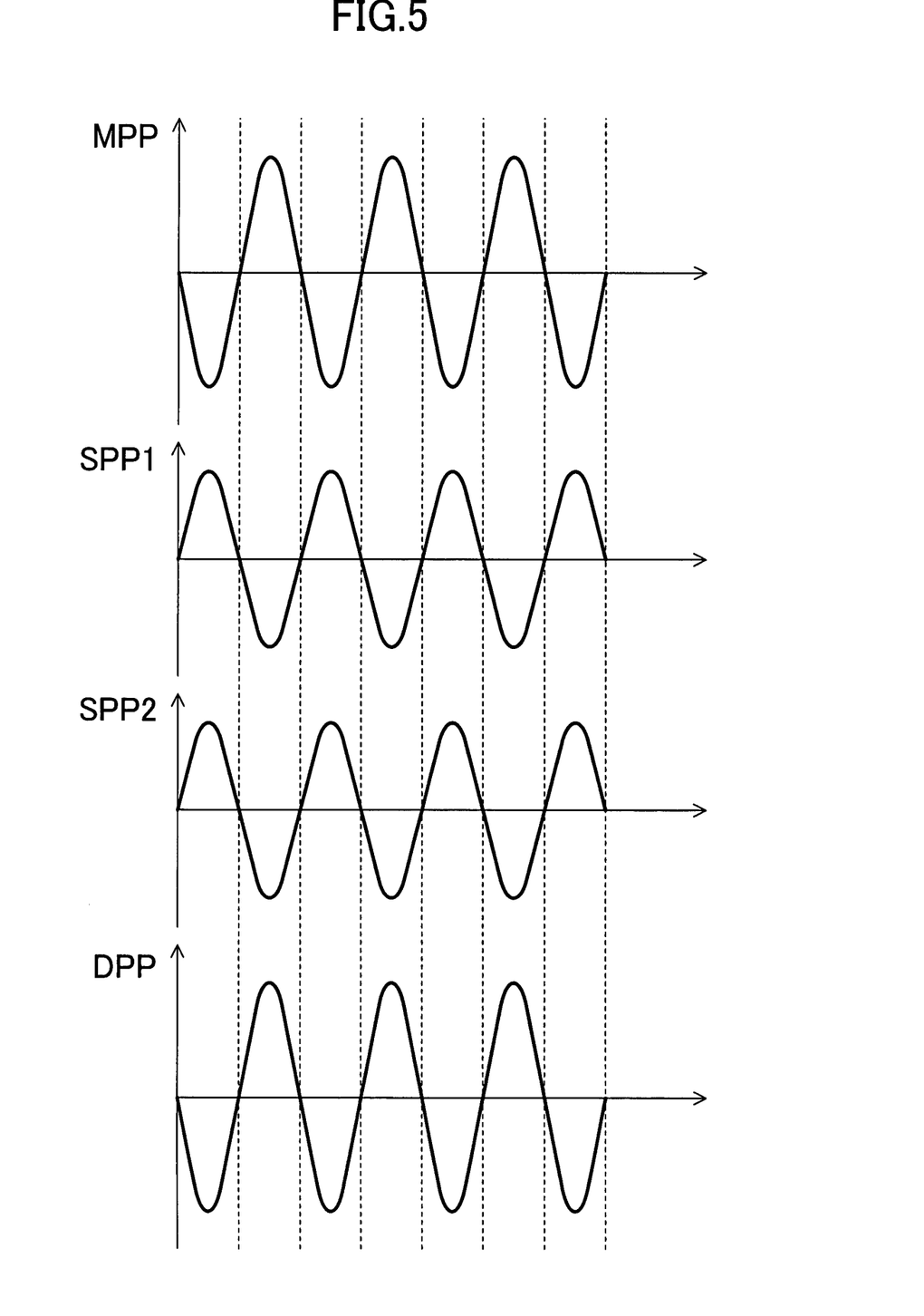
FIG. 5 is a graph showing signal waveforms obtained by the photodetector of the optical pickup device illustrated in FIG. 1.

As shown in FIG. 4A, in a case where the convergence spots are formed on the recording surface of the optical information recording medium 101, when light beams reflected from the respective convergence spots on the optical information recording medium 101 are received by photodetectors (i.e., the light-receiving elements 113 through 115) shown in FIG. 2, a push-pull signal MPP associated with the main beam 102M and push-pull signals SPP1 and SPP2 associated with the sub-beams 102S1 and 102S2 are output. FIG. 5 shows output waveforms of the push-pull signals MPP, SPP1 and SPP2. As shown in FIG. 5, the phases of SPP1 and SPP2 are deviated from the phase of MPP exactly by 180°.

Figure 6:
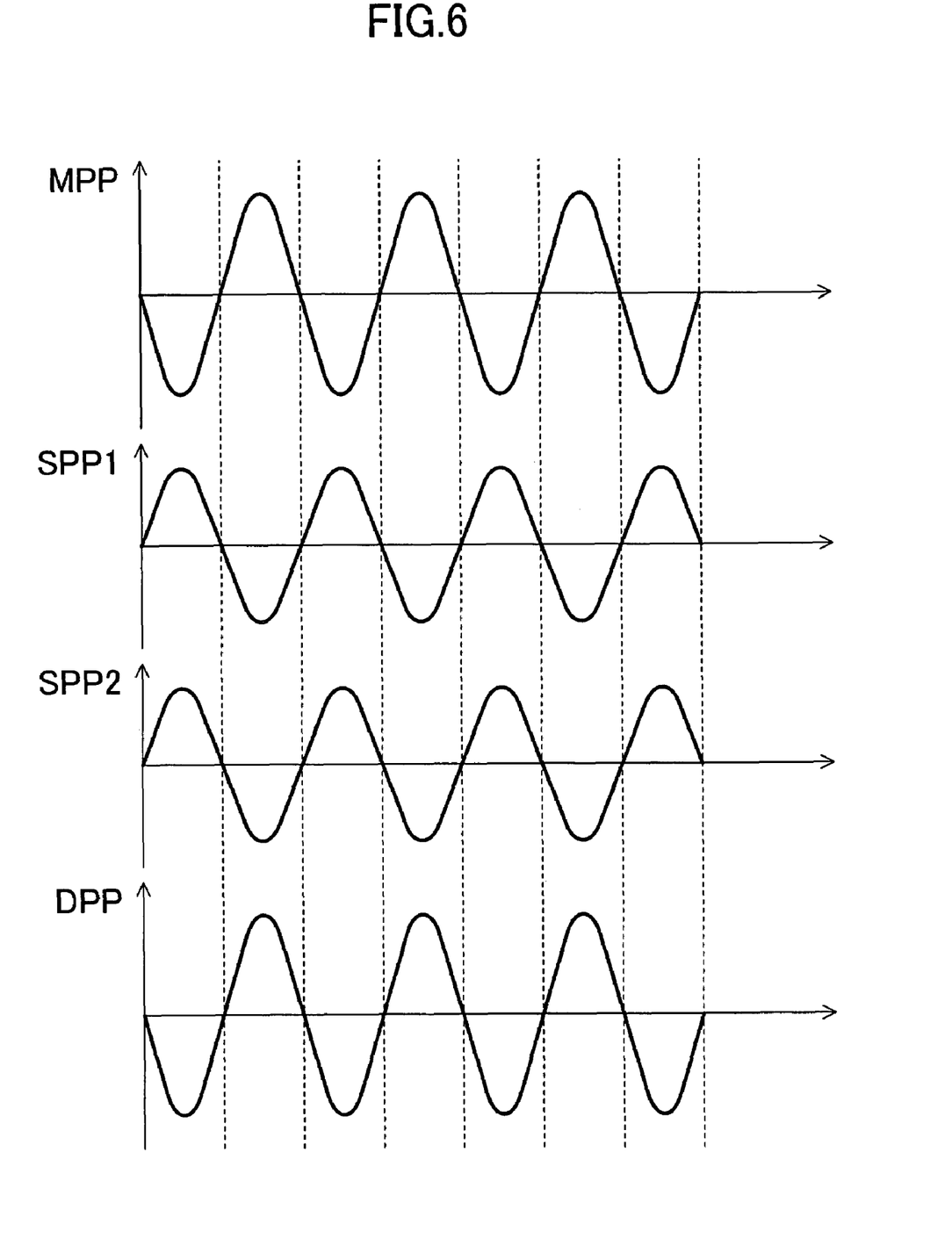
FIG. 6 is a graph showing signal waveforms obtained by the photodetector of the optical pickup device illustrated in FIG. 1.

In addition, as shown in FIG. 4B, in a case where the convergence spots are formed on the recording surface of the optical information recording medium 104, light beams reflected from the convergence spots on the optical information recording medium 104 are received by photodetectors (i.e., the light-receiving elements 116 through 118) shown in FIG. 2, a push-pull signal MPP associated with the main beam 105M and push-pull signals SPP1 and SPP2 associated with the sub-beams 105S1 and 105S2 are output. FIG. 6 shows output waveforms of the push-pull signals MPP, SPP1 and SPP2. As shown in FIG. 6, the phases of SPP1 and SPP2 are deviated from the phase of MPP exactly by 180°.

With respect to a radial shift (i.e., a shift in the radius direction of the optical information recording medium) of the object lens 112 or offset components of the push-pull signals MPP, SPP1 and SPP2 resulting from a tilt of the optical information recording medium 101 or 104, offsets occur at the same side (i.e., the same phase) with respect to the radial shift of the object lens 112 or the tilt of the optical information recording medium 101 or 104. Accordingly, arithmetic circuitry (i.e., the adder 122, the amplifier 123 and the subtracter 124) shown in FIG. 2 performs the following arithmetic:

$$DPP=MPP-k\times(SPP1+SPP2) \quad (1)$$

Then, a DPP signal in which the offset is canceled is detected. FIG. 5 shows a DPP signal obtained from Equation (1) based on the push-pull signal MPP associated with the main beam 102M and the push-pull signals SPP1 and SPP2 associated with the sub-beams 102S1 and 102S2. FIG. 6 shows a DPP signal obtained from Equation (1) based on the push-pull signal MPP associated with the main beam 105M and the push-pull signals SPP1 and SPP2 associated with the sub-beams 105S1 and 105S2. As shown in FIGS. 5 and 6, the DPP signals have proper values in both cases, so that the convergence spots are formed on a single guide groove.

In the arithmetic circuitry shown in FIG. 2, i.e., the arithmetic circuitry for detecting a tracking error signal by a differential push-pull method based on an output signal from the photodetector 109 (see FIG. 1), the input side of the adder 122 is connected to the output sides of the subtracters 120 and 121, the input side of the amplifier 123 is connected to the output side of the adder 122, and the input side of the subtracter 124 is connected to the output sides of the subtracter 119 and the amplifier 123. This causes the DPP signal to be output from the subtracter 124. The coefficient k in Equation (1) is used to correct the difference in light intensity among the main beam 102M (or 105M) and the sub-beams 102S1 (105S1) and 102S2 (105S2) reflected from the optical information recording medium 101 (or 104). When the optical intensity ratio among the main beam 102M (or 105M): the sub-beam 102S1 (or 105S1): the sub-beam 102S2 (or 105S2) is a:b:b, the coefficient $k=a/(2b)$. That is, the coefficient k is a constant which is determined depending on the optical information recording medium 101 or 104.

As described above, in this embodiment, the in-line DPP method is modified so that stable tracking error detection is performed on the optical information recording media 101 and 104 having different guide groove pitches using the first-wavelength light beam 102 and the second-wavelength light beam 105 even in an optical pickup device in which two different semiconductor lasers 103 and 106 are provided adjacent to each other. Specifically, the diffraction grating 107 illustrated in FIG. 3 makes the phase of the periodic structure of the area 128 and the phase of the periodic structure of the area 129 differ by 180° even when the emission center L2 of the second semiconductor laser 106, for example, passes not through the area (central area) 127 but, for example, near the boundary between the area 127 and each of the areas 128 and 129 (i.e., near an intersection of the parting lines D2 and D4). Accordingly, as shown in FIGS. 5 and 6, the shift of the phases of SPP1 and SPP2 from that of MPP is kept at 180°. As a result, DPP has a proper value so that convergence spots are formed on a single guide groove.

In this manner, in this embodiment, the diffraction grating 107, which is not conventionally used, provides the foregoing advantages. The configuration of a signal processor, for example, may be the same as that conventionally used.

In this embodiment, the first optical information recording medium 101 may be, for example, a DVD (such as a DVD, a DVD-ROM, a DVD-RAM, a DVD-R or a DVD-RW) and the second optical information recording medium 104 may be, for example, a CD (such as a CD, a CD-ROM, a CD-R or a CD-RW). In this case, the first wavelength of the light beam 102 for recording/playback of the first optical information recording medium 101 is about 650 nm and the second wavelength of the light beam 105 for recording/playback of the second optical information recording medium 104 is about 780 nm. Even in the case of a DVD having a guide groove pitch of 0.741 μm, e.g., a DVD-R, or a DVD having a guide groove pitch of 1.23 μm, e.g., a DVD-RAM, the optical pickup device of this embodiment enables stable tracking error signal detection.

In this embodiment, the first semiconductor laser 103 and the second semiconductor laser 106 are separately provided. Alternatively, the first semiconductor laser 103 and the second semiconductor laser 106 may be integrally formed as a two-wavelength monolithic semiconductor laser. In this case, the same advantages as those obtained in this embodiment are obtained. Three or more lasers serving as light sources may, of course, be provided.

In this embodiment, the diffraction grating 107 of the present invention is placed between the semiconductor lasers 103 and 106 and the half mirror 108 in the optical system illustrated in FIG. 1. Alternatively, the diffraction grating 107 may be placed between the half mirror 108 and the collimator lens 111. The optical system illustrated in FIG. 1 may be replaced with an optical system in which a light source and a photodetector are united (e.g., an optical system using no half mirror) so that the diffraction grating 107 of the present invention is placed between the light source and a collimator lens. That is, the optical system to which the diffraction grating 107 of the present invention is applied is not specifically limited.

In this embodiment, the grooves 125a through 129a are formed along the X direction in the respective areas 125 through 129 of the diffraction grating 107. Alternatively, the grooves may be formed in a slanting direction with respect to the X direction in the areas except for the area 127.

In this embodiment, the five areas 125 through 129 are defined in the diffraction grating 107. One or more areas each having a given periodic structure may be added to those areas in the diffraction grating 107.

As described above, the optical pickup device of this embodiment can cope with various optical recording media using two different semiconductor lasers and achieves tracking error signal detection with more stable recording/playback. That is, the optical pickup device of this embodiment achieves size reduction, simplification, cost reduction, higher efficiency and other advantages in recording/playback apparatus for DVDs and CDs. In addition, the optical pickup device of this embodiment is very useful as an optical pickup device having the function of detecting signals such as a playback/recording signal and various servo signals used in an optical head device serving as a main part of an optical information processor performing processing, such as recording, playback or erasure of information, on an optical information recording medium such as an optical disk.

What is claimed is:

1. An optical pickup device, comprising:
   a first semiconductor laser emitting a light beam having a first wavelength;

a second semiconductor laser placed in parallel with the first semiconductor laser and emitting a light beam having a second wavelength different from the first wavelength;

a diffraction grating for separating one of the light beam with the first wavelength and the light beam with the second wavelength into at least three light beams;

an object lens for causing each of said at least three light beams separated by the diffraction grating to converge and causing said at least three light beams to form at least three separate convergence spots on a recording surface of an optical information recording medium; and a photodetector for receiving light beams respectively reflected from said at least three convergence spots on the optical information recording medium, wherein the diffraction grating is partitioned into at least five areas each having a given periodic structure, said at least five areas include a first area, a second area adjacent to the first area in a first direction, a third area adjacent to the first area and the second area in a second direction, a fourth area defined with the third area sandwiched between the fourth area and the first area and a fifth area adjacent to the fourth area in the first direction and defined with the third area sandwiched between the fifth area and the second area, a phase of the periodic structure of each of the first and fifth areas is ahead of a phase of the periodic structure of the third area by substantially 90°, and a phase of the periodic structure of each of the second and fourth areas is behind a phase of the periodic structure of the third area by substantially 90°.

2. The optical pickup device of claim 1, wherein said at least three light beams separated by the diffraction grating include a 0th order diffracted beam, a +1st order diffracted beam and a −1st order diffracted beam.

3. The optical pickup device of claim 1, wherein a plurality of guide grooves are periodically arranged on the recording surface of the optical information recording medium, and the object lens causes said at least three convergence spots to be formed on one of the guide grooves.

4. The optical pickup device of claim 1, wherein the first, second, third, fourth and fifth areas of the diffraction grating have structures in which grooves and projections are alternately formed and the grooves and the projections have an identical width.

5. The optical pickup device of claim 1, wherein the direction of a first parting line between the first area and the second area of the diffraction grating and a second parting line between the fourth area and the fifth area of the diffraction grating substantially coincide with a direction parallel to a radius direction of the optical information recording medium, the direction of a third parting line between the third area and each of the first and second areas of the diffraction grating and the direction of a fourth parting line between the third area and each of the fourth and fifth areas of the diffraction grating substantially coincide with a direction parallel to a guide groove provided in the optical information recording medium, and the first parting line and the second parting line are substantially located on an identical line.

6. The optical pickup device of claim 1, wherein the direction of a line connecting a light-beam emission point of the first semiconductor laser and a light-beam emission point of the second semiconductor laser substantially coincides with a radius direction of the optical information recording medium.

7. The optical pickup device of claim 1, wherein a first parting line between the first area and the second area of the diffraction grating and a second parting line between the fourth area and the fifth area of the diffraction grating are substantially located on an identical line, and the diffraction grating is oriented to cause centers of light beams emitted from the first semiconductor laser and the second semiconductor laser, respectively, to pass through the identical line.

8. The optical pickup device of claim 1, wherein the second wavelength is longer than the first wavelength, a center of a light beam emitted from the first semiconductor laser passes through the third area of the diffraction grating, and a center of a light beam emitted from the second semiconductor laser passes through an intersection of a second parting line between the fourth area and the fifth area of the diffraction grating and a fourth parting line between the third area and each of the fourth and fifth areas of the diffraction grating.

9. The optical pickup device of claim 1, further comprising arithmetic circuitry for detecting a tracking error signal by a differential push-pull method, based on an output signal from the photodetector.

10. The optical pickup device of claim 1, wherein the first semiconductor laser and the second semiconductor laser are formed as a two-wavelength monolithic semiconductor laser.

11. The optical pickup device of claim 1, wherein the photodetector includes at least three light-receiving elements associated with light beams reflected from said at least three convergence spots on the optical information recording medium, and each of said at least three light-receiving elements is divided into at least two portions.

* * * * *